D. G. STANBROUGH.
MOTOR VEHICLE.
APPLICATION FILED JAN. 31, 1918.
1,391,864.
Patented Sept. 27, 1921.
5 SHEETS—SHEET 1.
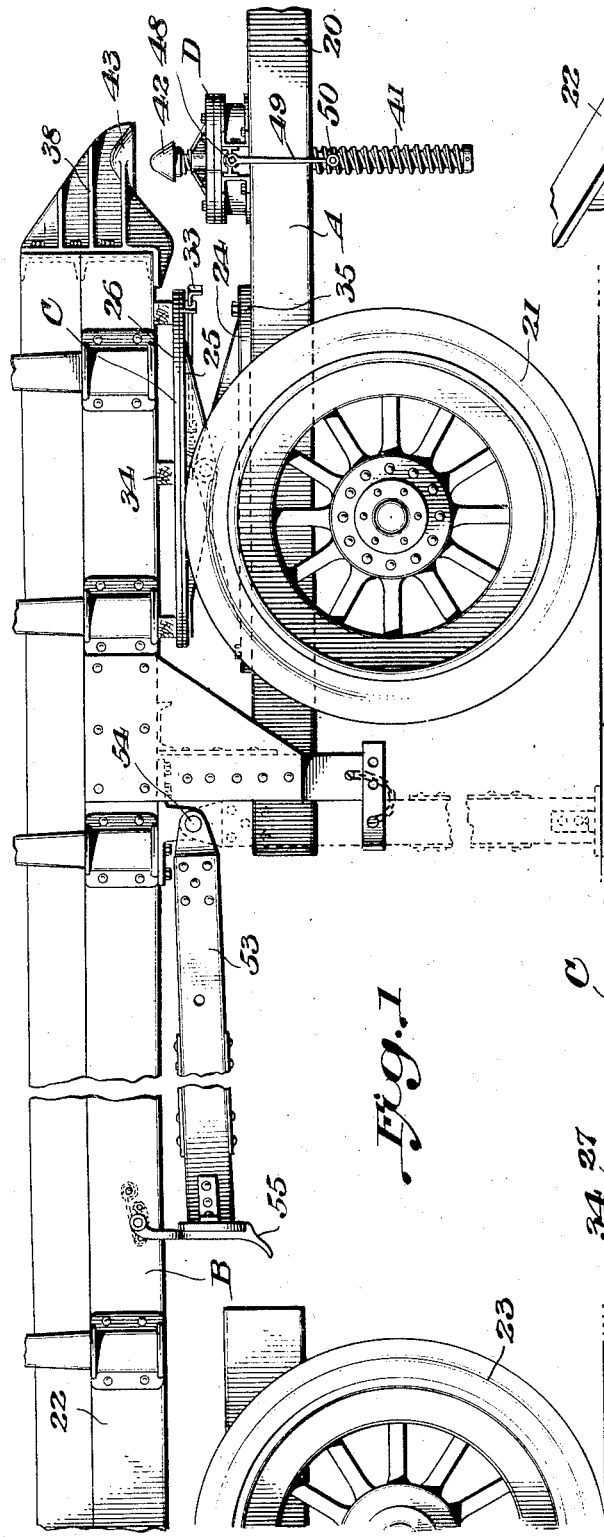
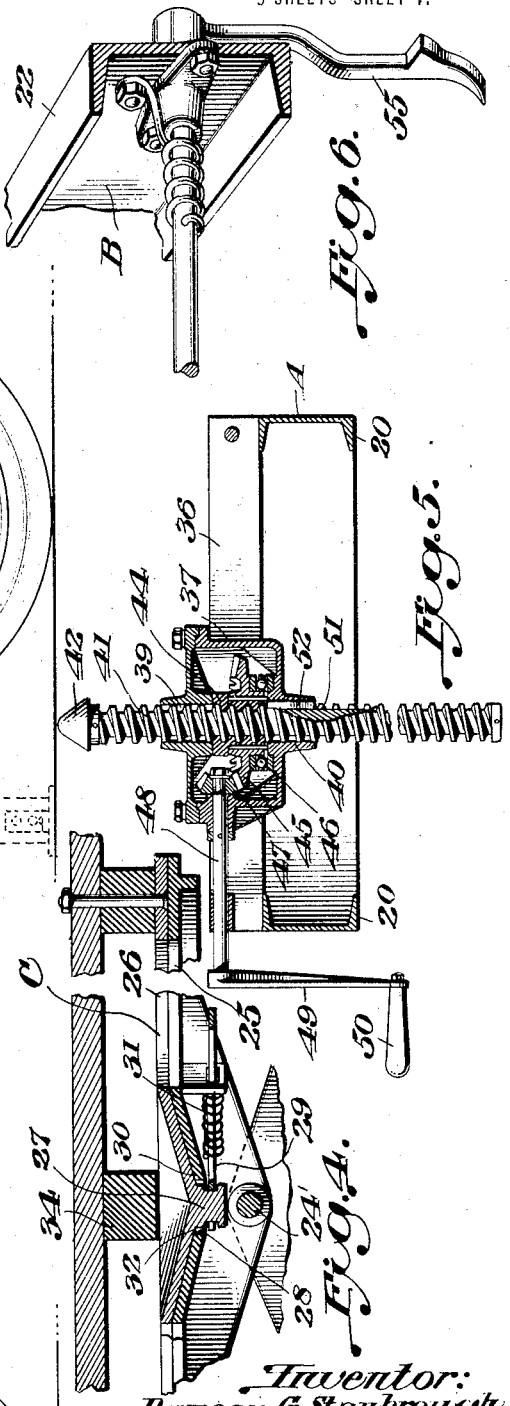
Inventor:
Duncan G. Stanbrough,
By Milton Sibbetts,
Atty.

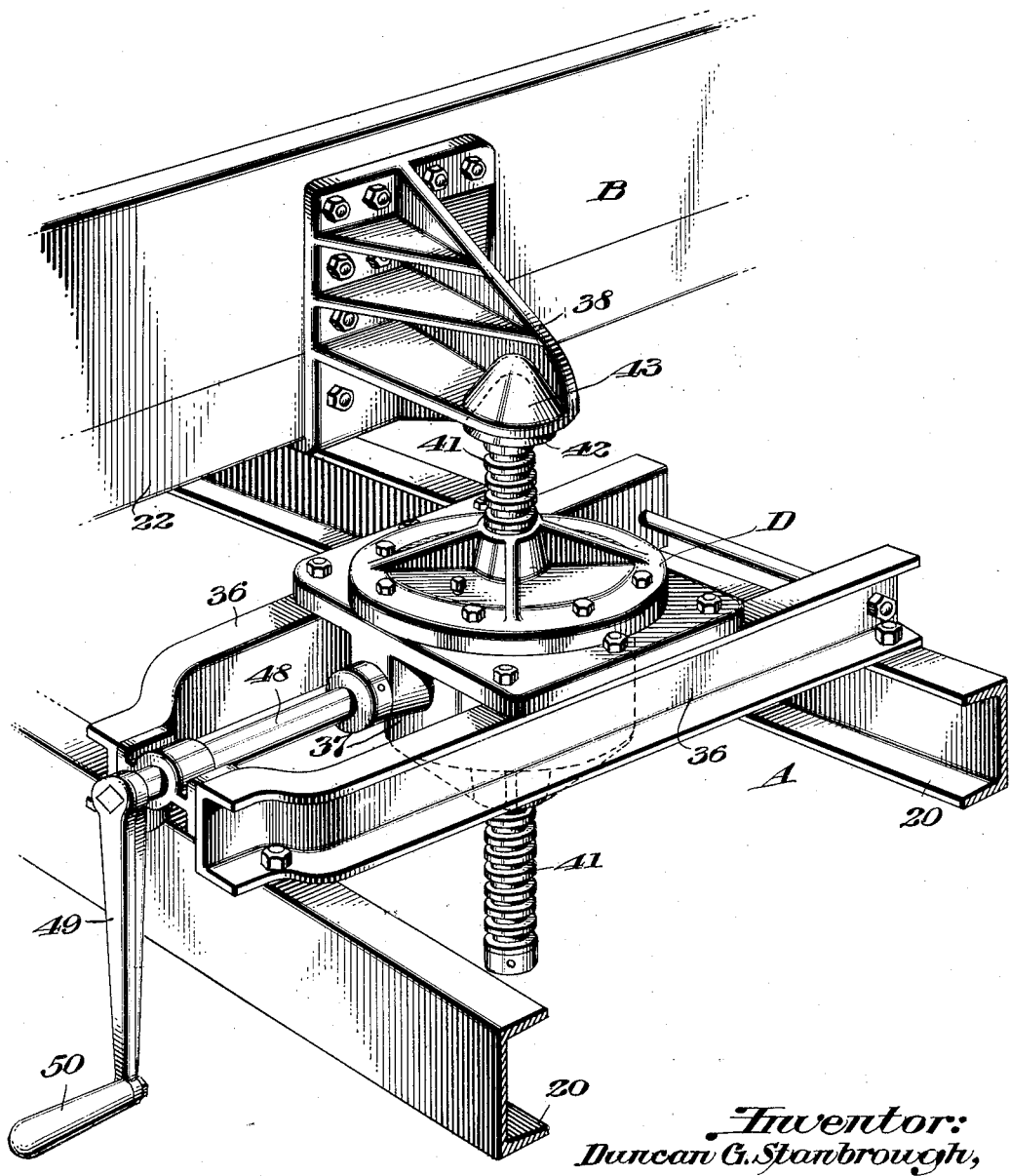

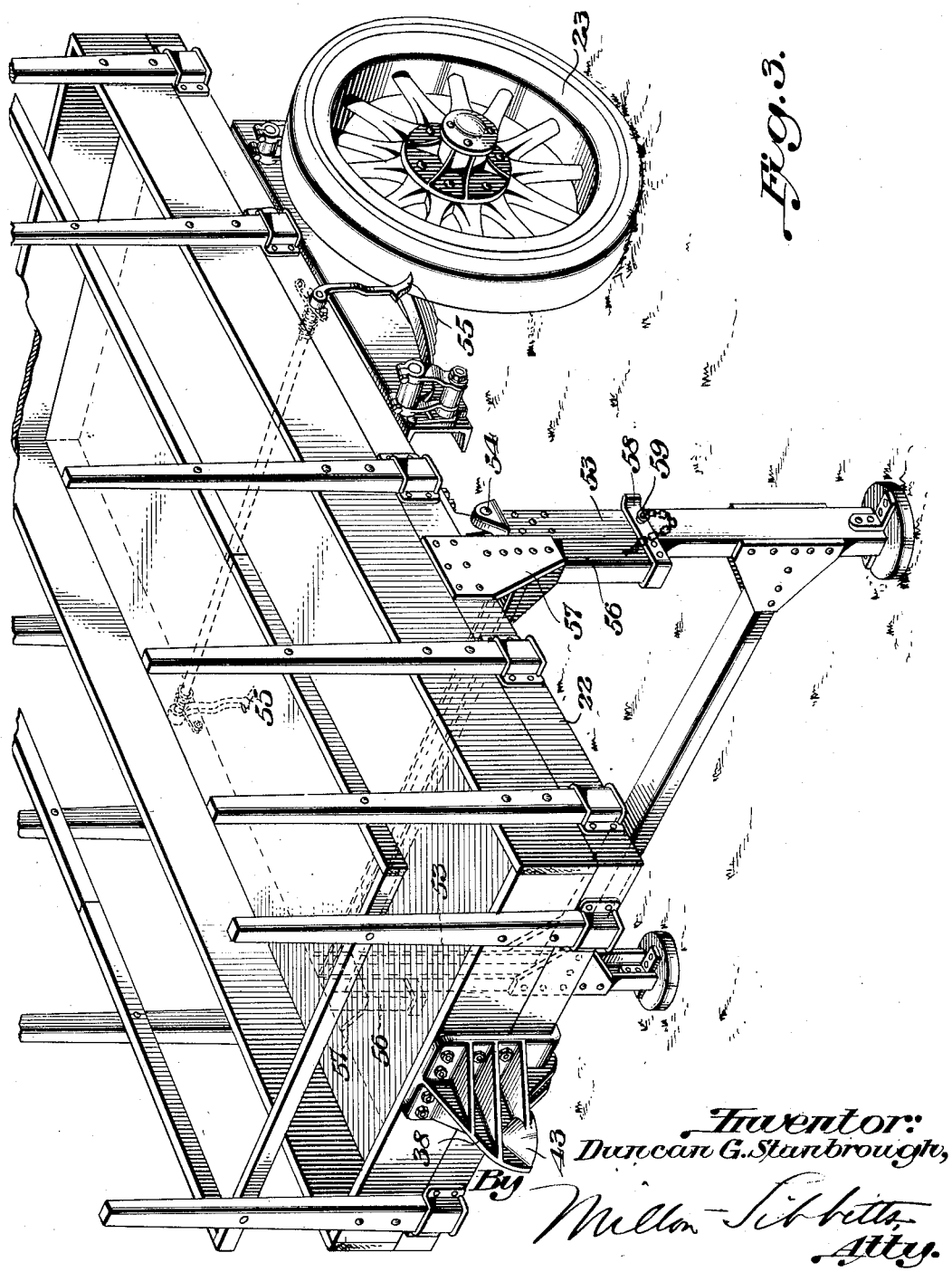

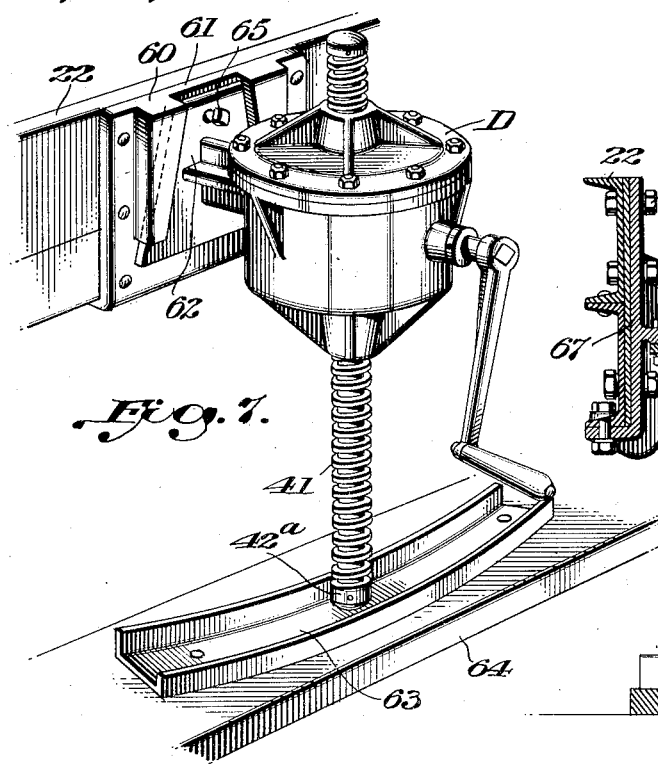
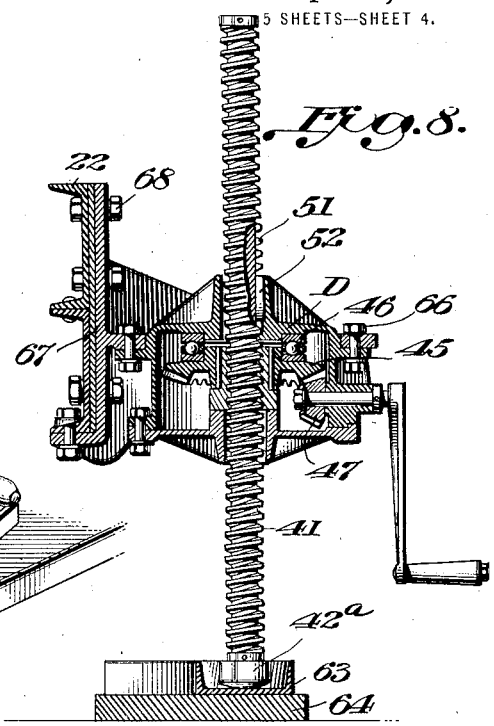
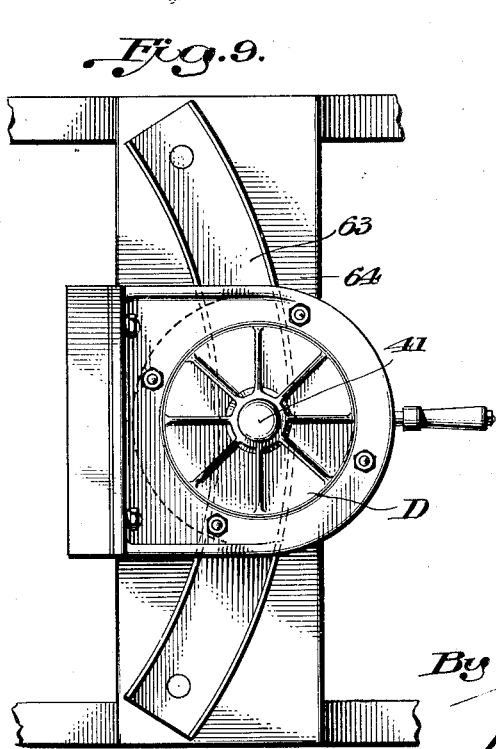
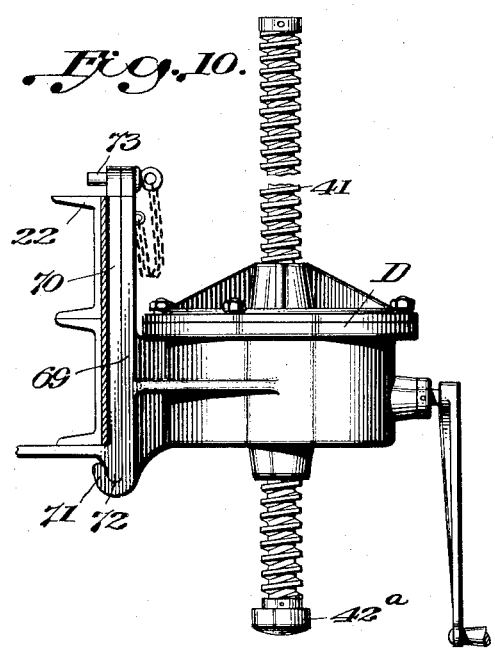

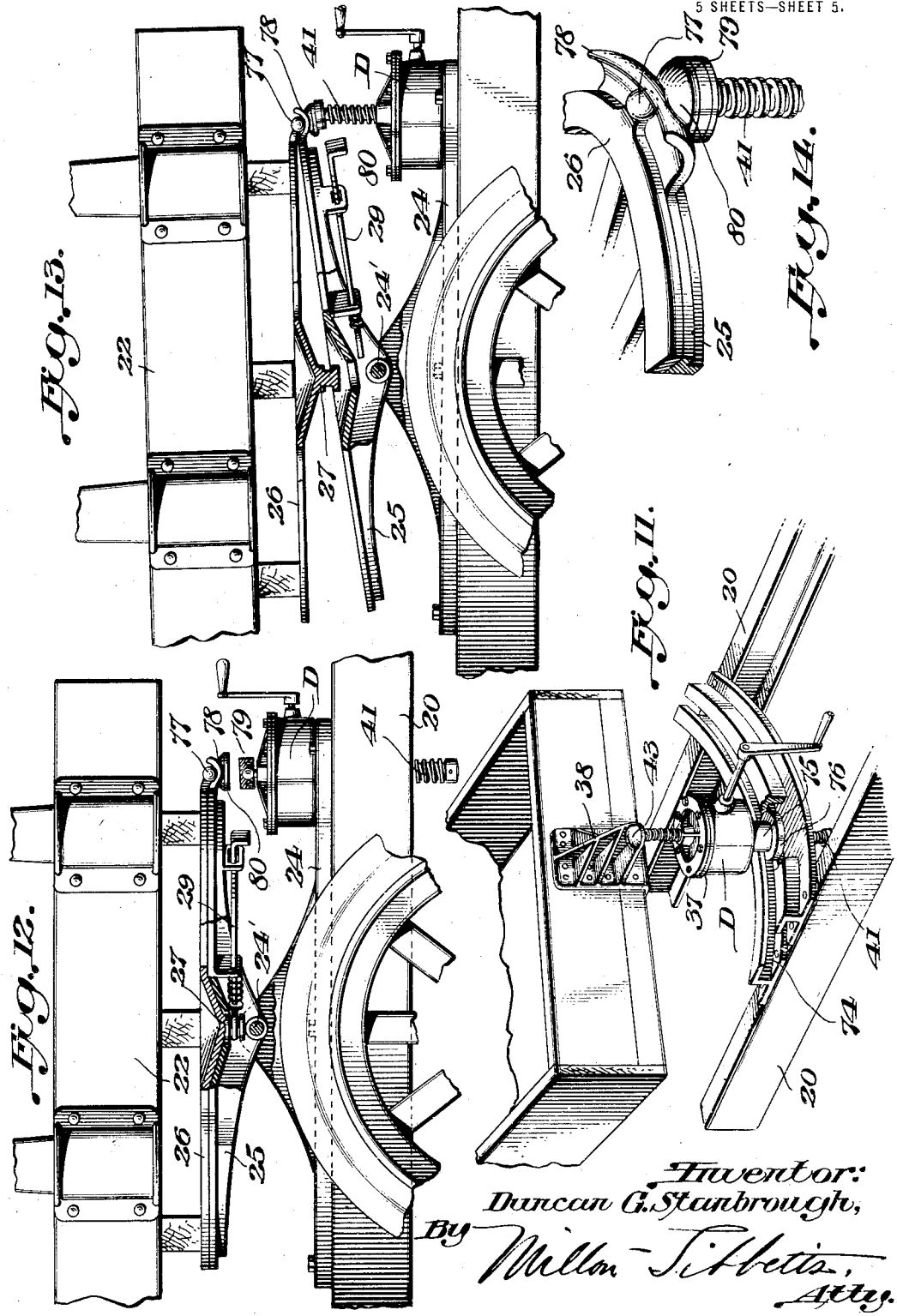

UNITED STATES PATENT OFFICE.

DUNCAN G. STANBROUGH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,391,864.  Specification of Letters Patent.  Patented Sept. 27, 1921.

Application filed January 31, 1918. Serial No. 214,732.

*To all whom it may concern:*

Be it known that I, DUNCAN G. STANBROUGH, a citizen of the United States, and resident of Detroit, Wayne county, State of Michigan, have invented certain new and useful Improvements in Motor-Vehicles, of which the following is a specification.

This invention relates to motor vehicles and particularly to tractor and trailer vehicles and the connections between them.

One of the objects of the invention is to provide a trailer vehicle, preferably of the two-wheel type with temporary or loading supporting devices so that the trailer may be supported for loading independently of the tractor vehicle to which it is adapted to be attached.

Another object of the invention is to provide a tractor vehicle and a trailer vehicle with a fifth-wheel connection between them and with a lifting device adapted to raise the trailer vehicle from the tractor vehicle so that a temporary support may be placed under the trailer vehicle.

Another object of the invention is to provide a trailer attaching unit in the form of a fifth-wheel and a lifting device to separate the parts connected by the fifth-wheel.

Other objects of the invention will appear from the following description taken in connection with the drawings which form a part of this specification, and in which:

Figure 1 is a side elevation of the rear part of a tractor vehicle and the forward part of a trailer vehicle together with attachments or connections between them embodying the invention;

Fig. 2 is an enlarged perspective view of the lifting device and contiguous parts of the vehicles shown in Fig. 1;

Fig. 3 is a perspective view of the trailer vehicle shown in Fig. 1, the vehicle in this case being detached from the tractor vehicle and supported at one end on its temporary legs;

Fig. 4 is a detail sectional view of parts of the fifth-wheel connecting device;

Fig. 5 is a detail vertical section through the lifting device shown in Figs. 1 and 2;

Fig. 6 is a perspective and partly sectional view illustrating one of the hooks for holding the supporting legs in inoperative position;

Fig. 7 is a view somewhat similar to Fig. 2 illustrating another form of lifting device;

Fig. 8 is a vertical sectional view through a lifting device similar to that shown in Fig. 7 but with a somewhat different mounting on the vehicle;

Fig. 9 is a plan view of the parts shown in Fig. 8;

Fig. 10 is an elevation of a lifting device similar to that shown in Figs. 7, 8 and 9 but illustrating another form of attachment to the vehicle;

Fig. 11 is a view similar to Fig. 2, illustrating another form of mounting for the lifting device on the tractor vehicle;

Fig. 12 is an elevation and part sectional view illustrating a trailer attaching unit in which the fifth-wheel construction is slightly different from that shown in the other views;

Fig. 13 is a view similar to Fig. 12, showing the upper half of the fifth-wheel in raised position; and Fig. 14 is a perspective detail view of adjacent parts of the fifth-wheel and lifting device shown in Figs. 12 and 13.

The invention is illustrated as applied to tractor and trailer vehicles such as are used in large quantities in this country, particularly in cities where package goods are to be transferred from storehouse to railroad or under similar conditions. It is usual to employ three or four trailer vehicles in connection with one tractor vehicle, the latter leaving one of the trailer vehicles to be loaded while it takes another loaded trailer vehicle to its destination. Since the trailer vehicles are usually made with only two supporting wheels and with a fifth-wheel connection to the tractor vehicle, it is of course necessary that some sort of temporary supporting structure shall be used to maintain the trailer vehicle in horizontal position when the tractor vehicle has been withdrawn. It is for the purpose of facilitating the use of tractor and trailer vehicles of this type that the present invention has been designed.

Referring to the drawings, A represents a tractor vehicle of the usual type embodying a frame 20 and traction wheels 21 which are driven through any suitable mechanism from a motor mounted on the vehicle and not shown in the drawings. B represents a trailer vehicle having a suitable frame 22 mounted upon a pair of supporting wheels 23 at its rear end. The forward end of the trailer vehicle B is adapted to be supported and drawn by the tractor vehicle A through a connecting means in the form of a fifth-wheel C. As shown in Figs. 1 and 4 this fifth-wheel comprises as its essential elements a base 24 which is mounted upon the frame 20 of the tractor vehicle A and upon which is pivoted as at 24' the lower half 25 of the fifth-wheel proper. The upper half 26 of the fifth-wheel coöperates with the lower half and is formed with a king-bolt 27 shown in detail in Fig. 4, which king-bolt is adapted to enter a suitable opening 28 formed in the lower half 25 of the fifth-wheel. A locking device or bolt 29 has a yoke end 30 which is adapted to be yieldingly held as by a spring 31 in a groove 32 formed in the king-bolt 27. A handle 33 on the locking device 29 permits the latter to be manually withdrawn so that the yoke 30 is out of engagement with the groove 32 in the king-bolt to thereby permit of the upper half 26 of the fifth-wheel and its king-bolt 27 being raised or withdrawn from contact with the lower half of the fifth-wheel, thus disengaging the trailer vehicle from the tractor vehicle. As shown, the upper half 26 of the fifth-wheel is secured to the trailer vehicle by means of several cross bars 34 and the base 24 is also rigidly secured to the frame 20 of the tractor vehicle A as by bolts 35.

For the purpose of thus raising the forward end of the trailer vehicle from the tractor vehicle a lifting device D is provided. This device is shown in Fig. 1 as mounted immediately forward of the fifth-wheel connection and is supported upon the frame 20 of the tractor vehicle A. In Fig. 2 it will be seen that cross members 36 support the casing 37 of the lifting device D so that the latter is directly beneath a bracket 38 which is secured to the forward end of the frame 22 of the trailer vehicle B. Extending through vertical openings 39 and 40 in the upper and lower walls of the casing 37 is a lifting bolt 41 having a head 42 adapted to enter a socket 43 formed in the bracket 38 and having its body part threaded as shown and extending through a nut 44 in the casing 37. On the nut 44 is a bevel gear 45 and a ball bearing 46 takes the end thrust between the gear and the lower wall of the casing 37. A bevel pinion 47 meshes with the gear 45 and is adapted to be rotated by a shaft 48 having a crank 49 and handle 50, the shaft 48 extending outside of the casing and laterally of the vehicle so that the crank 49 is in a convenient location at the side of the frame 20 as shown in Figs. 1, 2 and 5. The bolt 41 is also formed with a longitudinal keyway 51 and a key 52 in the casing 37 operates in the keyway 51 to prevent the bolt 41 from turning.

From the above description it will be seen that by operating the crank 49 to turn the shaft 48 the gear 45 and consequently the nut 44 are rotated about the bolt 41. Since the bolt cannot turn with the nut by reason of the key 52, it is moved vertically in the casing 37. In Fig. 1 the bolt is shown in its lowermost position. In Fig. 2 it has been raised so that its head 42 engages the socket 43 in the bracket 38. By further raising the bolt 41 the front end of the trailer vehicle B may be lifted until the king-bolt 27 is entirely clear of the lower half 25 of the fifth-wheel. If the trailer vehicle is then properly supported from the ground the bolt 41 may be lowered until it is disengaged from the socket 43 and the tractor vehicle A may then be run out from under the trailer vehicle.

For the purpose of temporarily supporting the front end of the trailer vehicle B while being loaded for example, one or more legs 53 are provided. As shown, there are two of these legs, one of them being pivotally connected to the vehicle at each side of the frame 22. In Fig. 1 the legs 53, pivoted at 54, are shown in full lines in folded or inoperative position, being held in this position by spring hooks 55 on the frame 22. The legs are in their operative or vertical position in dotted lines in Fig. 1 and in full lines in Fig. 3. In this position it will be seen that the legs are retained upright by beng detachably connected to a vertical bracket 56 which is securely connected to the frame member 22 as by plates 57. The detachable connection is in the form of a U-shaped piece 58 having a bolt 59 which is passed through the two arms of the piece 58 and through the leg 53. This construction is clearly illustrated in Figs. 1 and 3.

It will be seen that the legs 53 are pivoted to swing toward the rear as they are moved to their folded position, so that in case they should drop to the ground while the vehicle is in motion they would merely drag instead of materially retarding the operation of the vehicle.

With one of the trailer vehicles B resting on its two wheels 23 and its temporary legs 53, as shown in Fig. 3, the tractor vehicle A may be backed under it so that the lifting device D is directly beneath the bracket 38 and the lower half 25 of the fifth-wheel C would also be directly beneath the upper half 26 of said fifth-wheel, presuming of course that the two vehicles are in line. The socket 43 is somewhat larger than the head 42 for the purpose of allowing for some slight misalinement of the two vehicles. This is also true of the upper and lower parts of the fifth-wheel C, the latter having a conical-shaped depression at the middle of the fifth-wheel surrounding the opening 28 so that the king-bolt 27 will more readily enter the opening, as particularly shown in Fig. 4.

With the tractor vehicle directly beneath the front end of the trailer vehicle, the lifting device D is operated to raise the front end of the trailer vehicle until all of the weight thereof is taken off of the legs 53 and is supported by the tractor vehicle. The legs 53 may then be moved to their inoperative position where they will be held by the hooks 55 and the lifting device is reversed to permit the front end of the trailer and its part 26 of the fifth-wheel to drop down on the part 25 of the fifth-wheel with the king-bolt 27 in position in the opening 28. The locking-bolt 29 is then released so that it locks the king-bolt in position. Continued operation of the lifting device withdraws the bolt 41 until it is in the position shown in Fig. 1 where it has no connection with the bracket 38. The tractor vehicle A may then move forward and carry with it the trailer vehicle. In this movement of the vehicles the fifth-wheel takes care of the relative angularity of the two vehicles as in making turns and the pivotal connection 24' between the base 24 and the lower half 25 of the fifth-wheel takes care of certain unevenness in the road over which the vehicles are traveling.

It will be understood that the reverse operation takes place when the trailer vehicle is to be deposited on the ground and left there by the tractor vehicle.

In some instances it may be found that it will not be desirable to mount the lifting device D on the tractor vehicle and in this case the lifting device may be secured to the trailer vehicle, and preferably detachably secured so that it will not be necessary to have a lifting device for each such vehicle. Thus, in Fig. 7 the front end of the frame 22 of the trailer vehicle has a bracket 60 secured thereon and provided with an inverted dove-tail groove 61 which is adapted to receive a dove-tail bracket 62 on the lifting device D. In this case the working stroke of the lifting bolt 41 is downwardly instead of upwardly as in Fig. 5 and the head 42$^a$ of the lifting bolt coöperates with an arc-shaped plate 63 mounted on a cross beam 64 of the tractor vehicle frame 20. By this arrangement of lifting device and arc-shaped plate 63 the front end of the trailer vehicle may be raised even though that vehicle is not directly in line with the longitudinal axis of the tractor vehicle.

It will be understood that in this construction the lifting device D operates substantially as in the other figures and that the device as a whole may be removed from the bracket 60 and used on another trailer vehicle. A bolt 65 holds the device in place on the bracket 60 and the removal of this bolt permits the removal of the lifting device.

Fig. 8 shows the interior of the reverse lifting device such as is used in Fig. 7 and it will be seen that the thrust bearing 46 is at the top of the casing instead of at the bottom and the bevel gear 45 is also reversed. The key 52 is shown at the top of the casing instead of at the bottom, but otherwise the lifting device is the same as that shown in Fig. 5.

In said Fig. 8 the lifting device is more or less permanently secured to the frame 22 of the trailer vehicle, being bolted as by bolts 66 to a bracket 67 which is likewise bolted as by bolts 68 to the frame 22. The plate 63 and cross member 64 are the same as in Fig. 7. A plan view of this construction is shown in Fig. 9.

In Fig. 10 another detachable arrangement is illustrated. In this form the lifting device D has a bracket 69 adapted to set flat against a bracket 70 which is secured to the trailer vehicle frame 22, and a hooked end 71 on the bracket 69 extends under the lip 72 of the bracket 70 to give the lifting device a hold on the trailer frame. A pin 73 extending through the upper ends of the brackets 69 and 70 retains the lifting device in position.

In Fig. 11 the lifting device is mounted on the tractor vehicle and therefore operates upwardly as in Figs. 1, 2 and 5. However, instead of being rigidly secured to the tractor vehicle it is mounted on an arc-shaped runway 74 so that it may be moved laterally of the vehicle to bring it directly under the socket 43 of the bracket 38, in case the tractor and trailer vehicles are not exactly lined up. It will be understood that the axis of the arc-shaped runway is at the center of the king-bolt opening 28, shown particularly in Fig. 4. This runway is shown as made in two pieces and secured to the side members of the tractor frame 20, and the lower part of the casing 37 of the lifting device is formed with a shank 75, and a flange 76 which are adapted to operate in the runway 74. This construction will be clear by reference to Fig. 11. It will be seen also that the lifting device may if desired be removed from the tractor vehicle by pulling it out at the end of the runway.

In Figs. 12, 13 and 14 a form of the invention is illustrated in which the fifth-wheel and lifting device are combined to form a single unit, to thereby facilitate their manufacture and perhaps their sale as a single device. In these figures the base 24 of the fifth-wheel is secured to the tractor frame 20 as in Fig. 1 and has supported upon its horizontal pivot 24' the lower half 25 of the fifth-wheel. The upper half 26 of the fifth-wheel is secured to the front end of the frame 22 of the trailer vehicle and it is provided with the king-bolt 27 which coöperates with the locking device 29 as in Fig. 1.

Laterally of the pivot 24' the fifth-wheel parts 25 and 26 are formed with coöperating ball and socket pieces 77 and 78, which pieces are arranged so that they do not in any way interfere with the relative movements of the fifth-wheel parts as the latter oscillate on each other about the king-bolt 27. In these figures the ball device 77 is shown as in the form of a lug extending from the forward part of the upper half 26 of the fifth-wheel and the socket device 78 is directly beneath the ball device 77 and is in the form of a projection from the forward part of the lower half 25 of the fifth-wheel. The socket device may be somewhat elongated circumferentially of the fifth-wheel so that it is not absolutely necessary to have the tractor and trailer vehicles exactly lined up in order to bring the ball and socket into coöperative relation.

With the construction above described it will be seen that the upper half of the fifth-wheel and consequently the front end of the trailer device may be raised by rocking the lower half 25 of the fifth-wheel on its horizontal pivot 24'. The parts are shown in this raised position in Fig. 13, and for the purpose of rocking the lower half 25 of the fifth-wheel on its pivot a lifting device D such as shown in the other figures is mounted directly upon the base 24 of the fifth-wheel device. The lifting bolt 41 of the lifting device is provided with a plate 79 swiveled on it as shown particularly in Fig. 12 and the upper face of this plate is adapted to abut a similar plate 80 on the socket device 78 above described. From this it will be seen that after the locking bolt 31 is withdrawn the lifting device D may be operated to move the lifting bolt 41 upwardly against the socket device 78 to thereby rock the lower half 25 of the fifth-wheel on its pivot 24' and at the same time raise the forward end of the trailer vehicle so that the king-bolt 27 is entirely clear of the lower half of the fifth-wheel. The temporary legs or other supporting means of the trailer vehicle may then be dropped into place and the vehicle lowered down onto them and the tractor vehicle may then be withdrawn from under the trailer vehicle.

It will be further understood that my invention is not limited to the details of construction shown and other forms may be used without departing from the spirit or scope of the invention.

Having thus described my invention, what I claim and desire to secure by Letters Patent is:—

1. A trailer attaching unit comprising a member for attachment to a tractor vehicle, a member for attachment to a trailer vehicle, one of said members being pivotally mounted, connecting means between said members, and means engageable with said pivoted member for moving said member on its pivot to raise the other member.

2. A trailer attaching unit comprising a base, a fifth-wheel lower half pivoted on said base, a fifth-wheel upper half to coöperate with the lower half, and a lifting device mounted on the base and positioned to engage said fifth-wheel at a point eccentric to the axis thereof and to raise the fifth-wheel upper half off of the lower half.

3. A trailer attaching unit comprising a base, a fifth-wheel lower half mounted on a horizontal pivot thereon, a fifth-wheel upper half adapted to rest on the lower half, and means engageable with the lower half for moving said lower half on its pivot to thereby raise the upper half, for the purpose described.

4. A trailer attaching unit comprising a base, a fifth-wheel lower half mounted on a horizontal pivot thereon, a fifth-wheel upper half adapted to rest on the lower half and having a king-bolt connection therewith, and means mounted on the base for bearing against the lower half of the fifth-wheel and exerting pressure against the upper half to raise the upper half to clear the king-bolt connection.

5. The combination with a tractor vehicle and a trailer vehicle of a fifth-wheel connecting mechanism between said vehicles including a member carried by each of said vehicles and means positioned to operate on said fifth-wheel mechanism at a point remote from the axis thereof, for lifting said trailer vehicle with respect to said tractor vehicle.

6. The combination with a tractor vehicle and a trailer vehicle of a fifth-wheel connecting mechanism between said vehicles including a member fixed to said trailer vehicle and a member pivoted to said tractor vehicle and means engageable with said members for swinging the pivoted member on its pivot and lifting the fixed member and trailer vehicle.

7. The combination with a tractor vehicle having a fifth-wheel member pivoted thereto, of a trailer vehicle having a fifth-wheel member, said members having a king-bolt connection and means for swinging said pivoted member about a point on said trailer fifth-wheel member to raise the trailer-vehicle and clear the king-bolt connection.

In testimony whereof I affix my signature.

DUNCAN G. STANBROUGH.